United States Patent [19]

Hiraki

[11] Patent Number: 5,029,428
[45] Date of Patent: Jul. 9, 1991

[54] SOLAR CELL PANEL ASSEMBLY FOR DRIVING MOTOR-DRIVEN SCREEN DEVICE

[75] Inventor: Yoshiharu Hiraki, Toyama, Japan
[73] Assignee: Yoshida Kogyo K. K., Tokyo, Japan
[21] Appl. No.: 517,492
[22] Filed: May 1, 1990

Related U.S. Application Data

[63] Continuation of Ser. No. 308,543, Feb. 10, 1989, abandoned.

Foreign Application Priority Data

[30] Feb. 12, 1988 [JP] Japan .............................. 63-17405
[51] Int. Cl.$^5$ ............................ E04C 2/54; E06B 9/26
[52] U.S. Cl. ...................................... 52/788; 136/246; 136/251; 136/291; 160/166.1; 160/DIG. 17
[58] Field of Search ................... 136/246, 291, 251; 160/166.1, DIG. 17; 52/788

[56] References Cited

U.S. PATENT DOCUMENTS 4,238,246 12/1980 Genequand et al. ................. 136/248

Primary Examiner—Aaron Weisstuch
Attorney, Agent, or Firm—Hill, Van Santen, Steadman & Simpson

[57] ABSTRACT

A solar cell panel assembly for supplying power to a motor-driven screen device incorporated in a double-glazed sliding door unit, comprises a strip-like solar cell panel provided in a lower portion of an inner surface of an outer windowpane of the door unit so as to abut on the inner surface of the outer windowpane in facing engagement therewith; and an elongated solar collector or Fresnel lens a rear surface of which abuts on a lower portion of an outer surface of the outer windowpane in front of the strip-like solar cell panel. The solar cell panel assembly further comprises: a strip-like sunlight reflector provided below the elongated solar collector, which reflector has a reflective surface facing upward.

4 Claims, 2 Drawing Sheets

SOLAR CELL PANEL ASSEMBLY FOR DRIVING MOTOR-DRIVEN SCREEN DEVICE

This is a continuation of application Ser. No. 308,543, filed 2/10/89, now abandoned.

BACKGROUND OF THE INVENTION

1. Field of the Invention

The present invention relates to a solar cell panel assembly for supplying power to a motor-driven screen device incorporated in a double-glazed sliding door unit.

2. Description of the Prior Art

Many types of motor-driven screen devices powered by solar cells or by a solar cell panel have been previously proposed, for example as is in Japanese Utility Model Application Laid-Open Specification No. 60-31499. In recent years, as shown in FIG. 1, in order to prevent both a motor-driven blind 2 and a solar cell panel 3 from being subjected to damage and dirt, a double-glazed sliding door unit 1 in which the motor-driven blind 2 and the solar cell panel 3 are incorporated has evolved.

In the double-glazed sliding door unit 1 having the above construction, hitherto, as shown in FIG. 2, the solar cell panel 3 is vertically fixed to a lower portion of an inner surface of an outer windowpane 1A.

However, a problem is present in the double-glazed sliding door unit 1 having the solar cell panel 3 provided in such lower portion of the inner surface of the outer windowpane 1A. The problem is that the solar cell panel 3 suffers from a limited power output even when oriented toward south in summer during which time the sun rises to its highest angle above the horizon so as to decrease the angle of incidence of the sunlight. The decreased angle of incidence leads to both of an increase of the amount of sunlight reflected back by, for example, the window surface and a decrease in effective sunlight-receiving area of the solar cell panel 3 perpendicular to sunlight.

SUMMARY OF THE INVENTION

It is an object of the present invention to provide a solar cell panel assembly for supplying power to a motor driven screen device incorporated in a double-glazed sliding door unit, which assembly is relatively simple in construction and excellent in sunlight-gathering efficiency thereby increasing its power output.

The above object of the present invention is accomplished by providing:

a solar cell panel assembly for supplying power to a motor driven screen device incorporated in a double-glazed sliding door unit, comprising: a strip-like solar cell panel provided in a lower portion of an inner surface of an outer windowpane of said double-glazed sliding door unit so as to abut on said inner surface in facing engagement therewith; and an elongated solar collector a rear surface of which abuts on a lower portion of an outer surface of said outer windowpane in front of said strip like solar cell panel.

According to the present invention, the above solar cell panel assembly for supplying power to the motor-driven screen device incorporated in the double-glazed sliding door unit, further comprises: a strip-like sunlight reflector provided below said elongated solar collector, said sunlight reflector being oriented with its reflective surface facing upward.

According to the present invention, in the above solar cell panel assembly for supplying power to the motor driven screen device incorporated in the double-glazed sliding door unit, the elongated solar collector may be constructed of a substantially cylindrical Fresnel lens.

In the solar cell panel assembly of the present invention for supplying power to the motor-driven screen device incorporated in the double-glazed sliding door unit, since the solar collector having a specific construction is provided in front of the solar cell panel, it is possible to substantially enlarge the sunlight-gathering area of the assembly, which makes it possible to increase the amount of solar energy received by the assembly. In addition, in the solar cell panel assembly of the present invention, since the solar collector substantially constitutes a multiconvex lens which can make the angle of incidence of the sunlight as measured from the normal of the plane of the solar cell panel small as compared with that of the assembly of the prior art, it is possible for more sunlight to easily enter the solar cell panel assembly. In other words, it is possible to decrease the amount of sunlight reflected by the outer windowpane and by the surface of the solar panel, so that the sunlight-gathering efficiency of the assembly is considerably improved, thereby increasing the power output of the assembly.

Furthermore, in the solar cell panel assembly of the present invention, since a sunlight reflector is provided, it is also possible for the assembly to collect sunlight not directly incident on the solar collector of the assembly in addition to sunlight that is directly incident upon the solar collector. More specifically, it is possible for the assembly to collect more sunlight so as to increase its power output.

Other objects and advantages of the present invention will be apparent from the following description, the accompanying drawings and the appended claims.

DESCRIPTION OF THE PREFERRED EMBODIMENTS

The present invention will now be described, by way of example, with reference to the accompanying drawings which show an embodiment of the improved solar cell panel assembly of the present invention incorporated in a double-glazed sliding door unit 1.

Figures 1, 2:
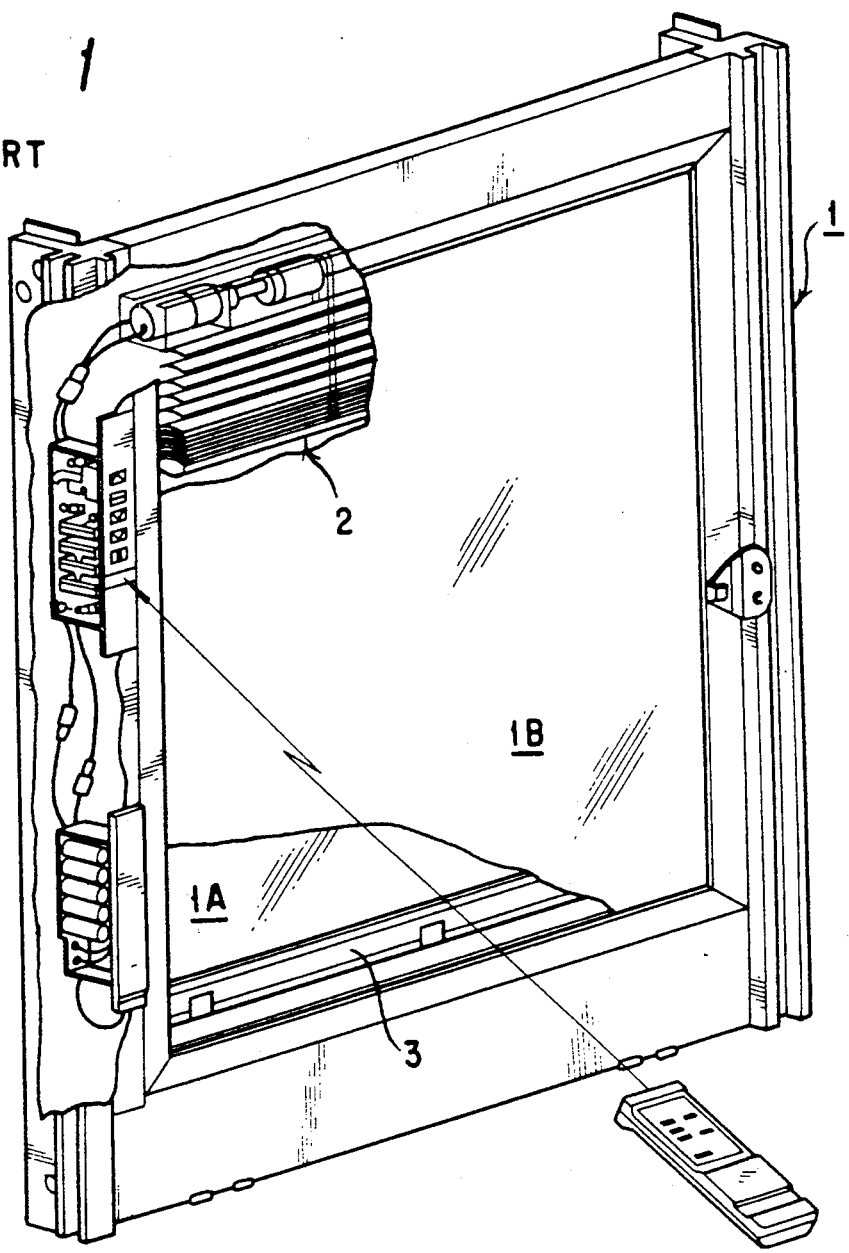
FIG. 1 is a partially cut-away perspective view of a conventional double-glazed sliding door unit in which a conventional solar cell panel assembly for supplying power to a motor-driven screen device is incorporated.
FIG. 2 is a partial cross-sectional view of an essential part of the conventional double-glazed sliding door unit shown in FIG. 1, for illustrating the conventional solar cell panel assembly incorporated therein.
Figure 3:
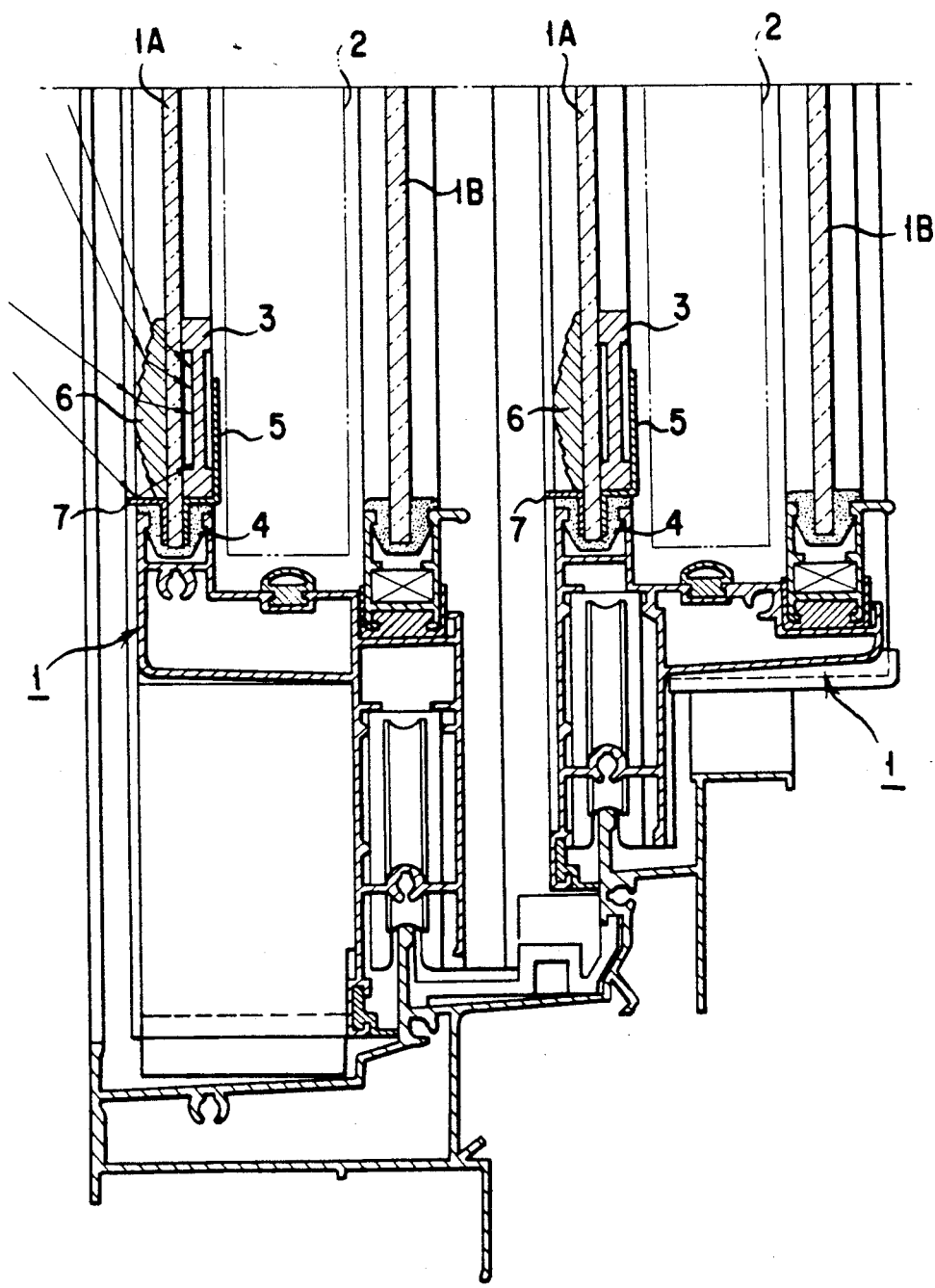
FIG. 3 is a partial cross-sectional view of an essential part of a double-glazed sliding door unit in which a solar cell panel assembly of the present invention for supplying power to a motor-driven screen device is incorporated.

In an embodiment of the present invention shown in FIG. 3, a motor-driven screen device such as, for example, a motor-driven blind 2 is incorporated in the double-glazed sliding door unit 1 which comprises an outer windowpane 1A and an inner windowpane 1B spaced apart from the outer windowpane 1A. A strip-like solar cell panel 3 is mounted in the door unit 1 through a gasket 4 at a position corresponding to a lower portion of an inner surface of the outer windowpane 1A of the double-glazed sliding door unit 1 so as to abut on the inner surface of the outer windowpane 1A in facing engagement therewith.

The solar cell panel 3 is fixed to the inner surface of the outer windowpane 1A through a plurality of fixing pieces 5 which are so disposed along a longitudinal direction of the solar cell panel 3 as to be spaced apart from each other. A base portion of each of the fixing pieces 5 is inserted into a groove portion of the gasket 4 so as to be sandwiched in between one of the inner side faces of the gasket 4 and the inner surface of the outer windowpane 1A as shown in FIG. 3.

In front of the solar cell panel 3 and the outer windowpane 1A, there is provided an elongated substantially cylindrical Fresnel lens 6 constituting a solar collector a rear surface of which abuts on a lower portion of an outer surface of the outer windowpane 1A so that the Fresnel lens 6 is mounted in the door unit 1 through the gasket 4. The Fresnel lens 6 assumes a relatively thin multi-convex lens form extending in a width direction of the double-glazed sliding door unit 1 so as to cover the entire solar cell panel 3.

According to the present invention, the solar cell panel assembly for driving the motor-driven screen device incorporated in the double-glazed sliding door unit 1 further comprises a strip-like sunlight reflector 7 which is provided below the Fresnel lens 6 so as to be mounted on the gasket 4. The sunlight reflector 7, which is constructed of materials such as stainless steels excellent in reflectivity and corrosion resistance, is oriented with its reflective surface facing upward to make it possible to collect sunlight not oriented toward the Fresnel lens 6. The sunlight reflector 7 assumes a substantially inverted L-shaped form in its cross section as shown in FIG. 3. A base portion of the sunlight reflector 7 is inserted into the groove portion of the gasket 4 so as to be sandwiched in between the other inner side face of the gasket 4 and the outer surface of the outer windowpane 1A.

The solar cell panel assembly of the present invention having the above construction is advantageous in that: since the assembly employs the Fresnel lens 6, it is possible to substantially enlarge a sunlight receiving area of the assembly, which makes it possible to receive more sunlight in summer when the sun rises to its highest angle above the horizon; and since the Fresnel lens 6 assumes a substantially multi-convex lens form which can make the incident angle of the sunlight as measured from the normal of the plane of the solar cell panel smaller as compared with that of the assembly in the prior art, it is possible for more sunlight to easily enter the solar cell panel assembly of the present invention. In other words, it is possible to decrease the amount of sunlight reflected by the outer windowpane and the surface of the solar panel, so that the sunlight-gathering efficiency of the assembly of the present invention is considerably improved thereby increasing the power output of the assembly.

Furthermore, in the solar panel assembly of the present invention, since there is provided the sunlight reflector 7, it is also possible for the assembly to collect sunlight not directly incident on the Fresnel lens of the assembly in addition to sunlight directly incident upon the Fresnel lens 6. Thus, it is possible for the assembly of the present invention to collect more sunlight so as to increase its power output.

Incidentally, since the above description refers the preferred embodiment, it should be understood that those skilled in the art could accomplish modifications within the scope of the present invention and accordingly, it is intended that the foregoing description and the accompanying drawings shall be interpreted as illustrative and not in a limiting sense. For example, the present invention is also applicable to any other motor-driven screen devices such as motor-driven curtains, motor-driven louvers and the like.

I claim:

1. A motor driven screen device incorporated in a double-glazed sliding door unit, comprising:
   a double-glazed sliding door unit having an outer windowpane and an inner windowpane spaced from said outer windowpane;
   a motor-driven screen apparatus mounted between said outer windowpane and said inner windowpane;
   a strip-like solar cell panel for powering said motor-driven screen apparatus mounted by a plurality of mount members at a lower portion of an inner surface of said outer windowpane of said double-glazed sliding door unit so as to abut on said inner surface in facing engagement therewith; and
   an elongated solar collector, a rear surface of which abuts on a lower portion of an outer surface of said outer windowpane in front of said strip-like solar cell panel so that light is directed by said solar collector through said outer windowpane onto said solar cell panel, said solar collector refracting light incident thereon to an smaller angle relative to a normal to said solar cell panel.

2. The device as set forth in claim 1, further comprising:
   a strip-like sunlight reflector provided below said elongated solar collector, said sunlight reflector having a reflective surface facing upward so as to reflect light onto said solar collector.

3. The device as set forth in claim 1, wherein:
   said elongated solar collector comprises a substantially cylindrical Fresnel lens.

4. The device as set forth in claim 2, wherein:
   said elongated solar collector comprises a substantially cylindrical Fresnel lens.

* * * * *